Figure 1:
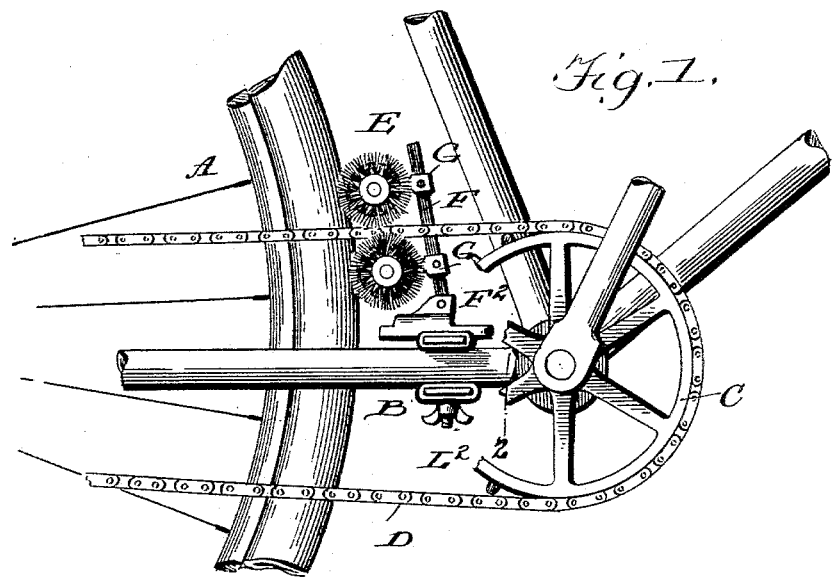

(No Model.)

J. T. REAGAN.
DEVICE FOR CLEANING BICYCLE CHAINS.

No. 584,238.  Patented June 8, 1897.

Witnesses:
L. C. Hills
A. L. Hough

Inventor:
John T. Reagan,
by Franklin H. Hough
Atty.

UNITED STATES PATENT OFFICE.

JOHN THOMAS REAGAN, OF NEWPORT, RHODE ISLAND.

DEVICE FOR CLEANING BICYCLE-CHAINS.

SPECIFICATION forming part of Letters Patent No. 584,238, dated June 8, 1897.

Application filed November 16, 1896. Serial No. 612,309. (No model.)

*To all whom it may concern:*

Be it known that I, JOHN THOMAS REAGAN, a citizen of the United States, residing at Newport, in the county of Newport and State of Rhode Island, have invented certain new and useful Improvements in Devices for Cleaning Bicycle-Chains; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in sprocket-chain-cleaning attachments for bicycles, and particularly to improvements in that class of chain-cleaning attachments in which the chain is caused to pass between rotating brushes to which motion is imparted automatically by the rear wheel of the bicycle when in use.

The invention has for its more immediate object the improvement upon the particular construction of chain-cleaning device described and claimed in Patent No. 545,972, granted upon September 10, 1895, to Charles G. Polleys and myself. In the construction described and shown in said patent one of the plates or jaws adapted for use in securing the cleaning device to the back forks of the bicycle-frame is shown as cast integral with and forming a portion of the casting which is attached to the main bar carrying the journal-bearings of the rollers and brushes. In practical use of the device this construction has been found to be objectionable, owing to the wide variation that is found to exist in the shapes of the frames of bicycles of different makes and in the variation in the angle between the rods or tubes forming the back forks of the different machines upon the market. Having one of the plates or securing-jaws thus integral with the casting secured to the bar carrying the journal-bearings of the rollers and brushes renders it impossible to attach the device to the frames of some makes of bicycles in such manner as to insure perfect contact of the friction-rollers with the tire of the rear wheel of the bicycle; and the essential object of the present invention is to overcome this objection and to provide a chain-cleaning attachment for bicycles adapted to be automatically operated by the rotation of the rear wheel of the bicycle, the device being adapted so as to admit of its use in connection with any of the various constructions or forms of bicycle-frames.

To these ends and to such others as the invention may pertain the same consists in the novel construction and in the proper arrangement, combination, and adaptation of parts, all as more fully hereinafter described, shown in the accompanying drawings, and then specifically defined in the appended claim.

The invention is clearly illustrated in the accompanying drawings, which, with the letters of reference marked thereon, form a part of this specification, and in which drawings—

Figure 2:
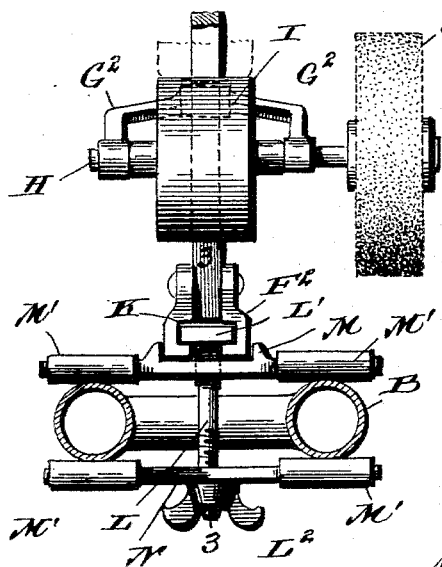
Figure 3:
Figure 4:
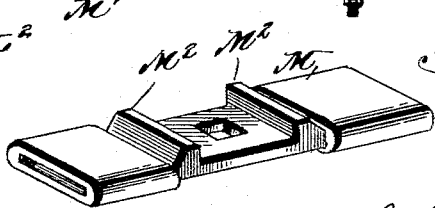

Figure 1 is a side elevation of a portion of a bicycle, showing my improved form of sprocket-chain-cleaning device attached in operative position. Fig. 2 is a section upon the line 2 2 of Fig. 1. Fig. 3 is a section upon the line 3 3 of Fig. 2. Fig. 4 is an enlarged detail in perspective of one of the clamping-plates.

Reference now being had to the details of the drawings by letter, A designates a portion of the rear wheel of a bicycle, and B the rear forks of the bicycle-frame.

C is the sprocket-wheel, and D the sprocket-chain, of the bicycle, all of which are of well-known and ordinary construction.

E represents my bicycle-cleaning attachment, which consists, essentially, of a rack or bar F, having riveted or otherwise fixedly secured to one of its ends a casting $F^2$. The rack or bar F extends at an angle substantially about sixty degrees from a line drawn longitudinally through the casting $F^2$.

G G are castings which are adjustable upon the rack or bar F, said castings being provided with arms $G^2$, wherein the lower ends of each are journaled, each shaft H carrying a roller I and circular brush J. The casting $F^2$ is provided with a longitudinal dovetailed recess K, within which recess is seated the head $L'$ of a bolt L, said bolt being provided at its lower end with a thumb-screw $L^2$.

M and N are clamping-plates provided at their ends with a covering of rubber or other material $M'$ to prevent abrasion or injury to the rear forks of the bicycle-frame, with which the said bars contact, as will hereinafter appear. The bar M is provided upon one of its faces with transverse ribs $M^2$, extending transversely across the face of the clamp, and between these ridges is received the casting $F^2$.

In use the device is clamped to the rear forks of the bicycle-frame immediately in advance of the rear wheel of the bicycle, as shown in Fig. 1 of the drawings. The ends of the clamping-bars M and N, engaging the upper and lower faces of the said bars, are held in place by means of the bolt L. It will be observed that when thus secured in position the rollers I will bear upon the tire of the bicycle-wheel and that the chain will pass between the rotary brushes. In operating the bicycle the rotation of the rear wheel of the bicycle will transmit motion through the agency of the rollers I to the brushes J, said brushes serving to effectually remove all dirt or accumulations of any kind from the chain passing between them. The casting $F^2$, being secured rigidly to the rack or bar F, insures uniform contact of the rollers against the tire of the wheel and the clamping-bars M and N being made adjustable in the direction of the length of the casting and the degree of pressure of the friction-rollers I against the tire of the wheel may be readily adjusted at any time by means of the adjustable clamping-bars M and N, it being simply necessary to loosen the thumb-screw $L^2$ and move the clamping-bars either in the direction of or away from the wheel.

Having thus described my invention, what I claim to be new, and desire to secure by Letters Patent, is—

In a cleaning device for bicycles, the combination with the clamping-plates N and M, of the recessed casting $F^2$ slotted and designed to be adjusted between the ribs $M^2$ on plate M, the bolt L having a head engaging with the inturned edges of the said casting, of the bar F mounted on the casting and carrying brushes, and held in an inclined position by reason of its bearing against an inclined portion of the said casting, substantially as shown and described.

In testimony whereof I affix my signature in presence of two witnesses.

JOHN THOMAS REAGAN.

Witnesses:
   CHAS. S. CRANDALL,
   JOHN F. CUTTLE.